(12) United States Patent
Jang et al.

(10) Patent No.: US 9,274,244 B2
(45) Date of Patent: Mar. 1, 2016

(54) SECURITY CHECKING SYSTEM USING X-RAYS AND NEUTRONS

(75) Inventors: Kyu Ha Jang, Seoul (KR); Byung Cheol Lee, Daejeon (KR); Yong Gui Li, Daejeon (KR); Sang Hyun Lee, Daejeon (KR); Byung Nam Kim, Daegu (KR); Hee Yung Kang, Daejeon (KR)

(73) Assignee: KOREA ATOMIC ENERGY RESEARCH INSTITUTE, Yuseong-gu, Daejeon (KR)

( * ) Notice: Subject to any disclaimer, the term of this patent is extended or adjusted under 35 U.S.C. 154(b) by 142 days.

(21) Appl. No.: 14/123,777

(22) PCT Filed: May 16, 2012

(86) PCT No.: PCT/KR2012/003822
§ 371 (c)(1),
(2), (4) Date: Dec. 4, 2013

(87) PCT Pub. No.: WO2012/169732
PCT Pub. Date: Dec. 13, 2012

(65) Prior Publication Data
US 2014/0112436 A1    Apr. 24, 2014

(30) Foreign Application Priority Data
Jun. 10, 2011    (KR) .................. 10-2011-0056327

(51) Int. Cl.
*G01V 5/00*    (2006.01)

(52) U.S. Cl.
CPC ............ *G01V 5/0016* (2013.01); *G01V 5/0033* (2013.01)

(58) Field of Classification Search
CPC ............ H05H 7/02; H05H 9/02; H05H 7/12; H05H 9/048; H01J 35/16; A61N 2005/1089; A61N 5/1043; A61N 5/1064; A61N 5/1081; A61N 5/1067; A61N 2005/1022; A61N 2005/1088; A61N 2005/109; A61N 5/1001; A61N 5/1017; A61N 5/103; A61N 5/1071; A61N 2005/1061; A61N 5/10; A61N 5/1042; A61N 5/1047; A61N 5/1049; A61N 5/108; G01N 23/083; G01N 23/09; G01N 23/10; G01V 5/0016; G01V 5/0033; H05G 2/00; A61B 6/12; A61B 6/505; A61B 6/482; A61B 6/506; A61B 6/507; A61B 6/508; A61B 6/483; A61B 18/12; A61B 18/20; A61B 6/145; A61B 6/548; A61B 6/4258; A61B 6/4291; A61B 6/485; A61B 6/502; A61B 6/503; A61B 6/4021; A61B 6/504
USPC ................................. 378/72, 143, 57
See application file for complete search history.

(56) References Cited

U.S. PATENT DOCUMENTS

| 5,838,759 | A | 11/1998 | Armistead |
| 7,399,976 | B2 * | 7/2008 | Kang et al. ............... 250/390.04 |
| 2007/0096036 | A1 | 5/2007 | Kang et al. |
| 2010/0195791 | A1 * | 8/2010 | Ishkhanov et al. ............. 378/57 |

FOREIGN PATENT DOCUMENTS

| CN | 1959387 A | 5/2007 |
| JP | 2002-365399 A | 12/2002 |

(Continued)

OTHER PUBLICATIONS

International Search Report mailed Nov. 28, 2012 for International Application PCT/KR2012/003822, 3 pages.

*Primary Examiner* — Irakli Kiknadze

(57) ABSTRACT

Provided is a security checking system. The security checking system includes an electron beam acceleration unit for accelerating electron beams having at least one energy intensity, an X-ray guide unit converting the electron beams accelerated by the electron beam acceleration unit into X-rays to guide the converted X-rays into an object, a neutron guide unit, and a detection unit detecting the X-rays and neutrons passing through the object. Thus, nuclear materials within the object may be detected, and also, maintenance/repair costs may be inexpensive to improve economic feasibility.

7 Claims, 3 Drawing Sheets

(56) References Cited

FOREIGN PATENT DOCUMENTS

| | | |
|---|---|---|
| JP | 2002365399 A | 12/2002 |
| JP | 2007-127617 A | 5/2007 |
| JP | 2007-526483 A | 9/2007 |
| JP | 2004108994 A | 4/2008 |
| KR | 10-2005-0113596 A | 12/2005 |
| KR | 10-2008-0058457 A | 6/2008 |
| WO | 2005084352 A2 | 9/2005 |

\* cited by examiner

SECURITY CHECKING SYSTEM USING X-RAYS AND NEUTRONS

TECHNICAL FIELD

The present invention relates to a security checking system, and more particularly to, a security checking system using X-rays and neutrons, the security checking system increasing inspection efficiency by not only inspecting general cargo but also detecting nuclear materials.

BACKGROUND ART

In facilities handling international cargo, such as harbors and airports, are reinforcing security check in regard to cargo for the purpose of safety. Recently, in developed countries, for example U.S.A., inspection for not only explosives but also special nuclear materials is being requested in advance.

Generally, X-ray inspection is used for the inspection for explosives and nuclear materials. However, the X-ray inspection method is technically limited. Accordingly, an inspection method using a neutron source is being raised as a method for detecting the nuclear materials, U 235 and Pu-239, included in the cargo.

As a neutron source for detecting the nuclear materials, a Cf-252 isotope is generally used due to its convenience in use. However, a half-life of Cf-252 isotope is approximately 2.8 years, that is, a neutron production rate reduces so fast that the neutron generation rate may reduce to almost 1/10 or less after about eight years of use. In addition, handling of the Cf-252 isotope is not easy because a dedicated container is necessary when storing or transporting the Cf-252 isotope. Accordingly, when the nuclear material inspection method using the Cf-252 isotope is used, a charge cost of the Cf-252 isotope may be increased year after year due to the short half-life. In addition, a neutron generator is relatively uneconomical since an initial equipment of the neutron generator is expensive.

DISCLOSURE OF INVENTION

Technical Goals

An aspect of the present invention provides a security checking system using X-rays and neutrons, the security checking system increasing inspection efficiency with respect to not only general cargo but also nuclear materials while also increasing economical efficiency.

Technical Solutions

According to an aspect of the present invention, there is provided a security checking system including an electron beam (eBeam) acceleration unit to accelerate an eBeam having at least one energy level, an X-ray guide unit to convert the eBeam accelerated by the eBeam acceleration unit into X-rays and guide the X-rays to an object including a cargo, a neutron guide unit to convert the eBeam accelerated by the eBeam acceleration unit into neutrons and guide the neutrons to the object, and a detection unit to detect the X-rays and the neutrons passed through the object.

The X-ray guide unit and the neutron guide unit may be arranged parallel with each other to face the eBeam acceleration unit.

The eBeam acceleration unit may include a first acceleration unit to accelerate a first eBeam having at least one energy level toward the X-ray guide unit, and a second acceleration unit to accelerate a second eBeam having at least one energy level which is different from the energy level of the first eBeam toward the neutron guide unit.

The X-ray guide unit may include at least one first conversion unit to convert the eBeam into the X-rays and at least one first collimator unit to guide the X-rays to the object, the neutron guide unit may include at least one second conversion unit to convert the eBeam into the neutrons and at least one second collimator unit to guide the neutrons to the object, and a length of the second conversion unit may be larger than a length of the first conversion unit with respect to a direction in which the eBeam is converted to the neutrons and advanced.

The first conversion unit and the second conversion unit may include a tungsten (W) target.

The detection unit may include a first detection unit to detect the X-rays and a second detection unit to detect the neutrons.

According to another aspect of the present invention, there is provided a security check system including an eBeam acceleration unit to accelerate an eBeam having at least one energy level, a guide unit to convert the eBeam accelerated by the eBeam acceleration unit into X-rays and neutrons and guide the X-rays and the neutrons to an object including a cargo, and a detection unit to detect the cargo and nuclear materials included in the object, by detecting the X-rays and the neutrons passed through the object.

The guide unit may include an X-ray guide unit to guide the X-rays and a neutron guide unit to guide the neutrons, the X-ray guide unit and the neutron guide unit may be arranged parallel with each other to face the eBeam acceleration unit, and the detection unit may include a first detection unit to detect the X-rays and a second detection unit to detect the neutrons.

The eBeam acceleration unit may include a plurality of acceleration units to accelerate at least one eBeams having different energy levels.

The X-ray guide unit may include at least one first conversion unit to convert the eBeam into the X-rays and at least one first collimator unit to guide the X-rays to the object, the neutron guide unit may include at least one second conversion unit to convert the eBeam into the neutrons and at least one second collimator unit to guide the neutrons to the object, and a length of the second conversion unit may be larger than a length of the first conversion unit with respect to a direction in which the eBeam is converted to the neutrons and advanced.

Effects of Invention

A security checking system according to the present invention may detect contents of an object by converting an electron beam (eBeam) into neutrons. Accordingly, not only a general cargo but also nuclear materials included in the object may be detected by X-rays. As a result, check efficiency with respect to the object may be increased.

In addition, instead of a conventional expensive neutron source, an eBeam of which a maintenance cost and an initial cost are relatively low may be converted to a neutron to inspect nuclear materials. Accordingly, economical efficiency may be increased.

BEST MODE FOR CARRYING OUT THE INVENTION

Figure 1:
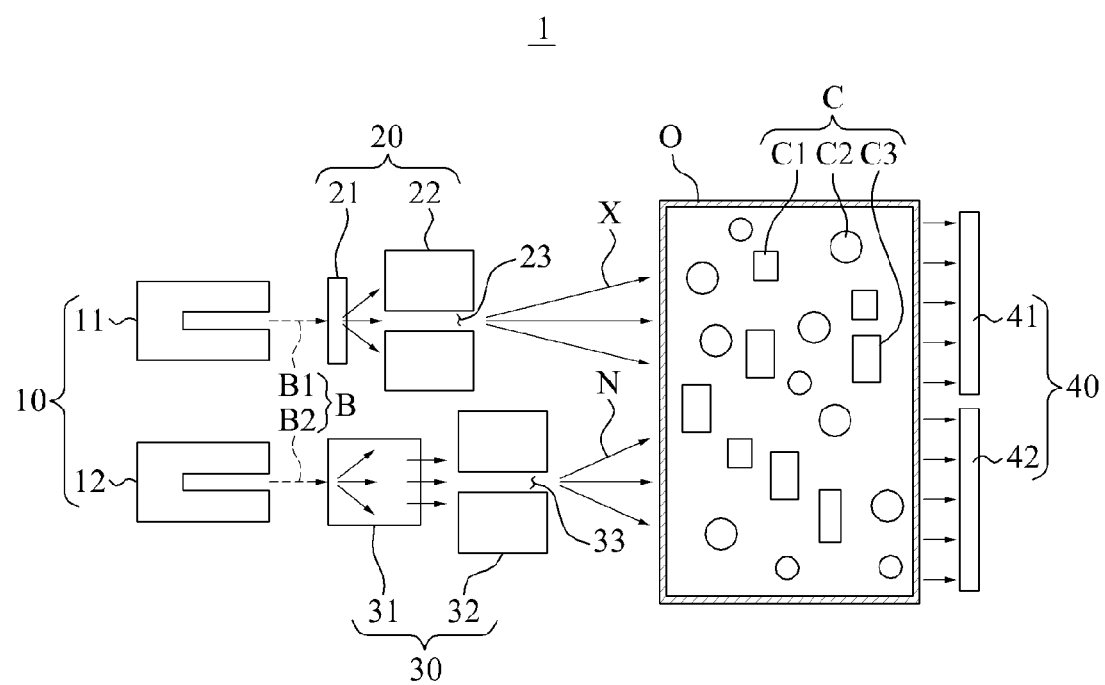
FIG. 1 is a diagram illustrating a security checking system using X-rays and neutrons, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 1, a security checking system 1 according to an embodiment of the present invention includes an electron beam (eBeam) acceleration unit 10, an X-ray guide unit 20, a neutron guide unit 30, and a detection unit 40.

For reference, the security checking system 1 described herein may be installed in facilities where international cargos come and go, such as a harbor and an airport, to inspect the cargos using X-rays X and neutrons N. The present embodiment, as shown in FIG. 1, the security checking system 1 inspects a cargo inside a predetermined object O such as a container, that is, contents C of the object O. Out of the contents C shown in FIG. 1, C1 denotes metallic materials, C2 denotes organic materials, and C3 denotes nuclear materials. That is, the security checking system 1 may detect even the nuclear materials C3 included in the object O as well as general cargos.

The eBeam acceleration unit 10 may accelerate an eBeam B having at least one energy level. The eBeam acceleration unit 10 may include a first acceleration unit 11 and a second acceleration unit 12, and accelerate at least one eBeam having a plurality of energy levels, for example, a first eBeam B1 and a second eBeam B2. The first acceleration unit 11 may accelerate the first eBeam B1 having at least one energy level toward the X-ray guide unit 20. The second acceleration unit 12 may accelerate the second eBeam B2 having at least one energy level, which is different from the energy level of the first eBeam B1, toward the neutron guide unit 30.

In the present embodiment, the first acceleration unit 11 may accelerate by sequentially generating the first eBeams B1 having energy levels of about 6 MeV and about 9 MeV in an alternating manner. The second acceleration unit 12 may accelerate the second eBeam B2 having an energy level of about 15 MeV. However, the energy levels of the first eBeam B1 and the second eBeam B2 accelerated by the first acceleration unit 11 and the second acceleration unit 12 may be varied. In addition, the eBeam acceleration unit 10 may be implemented as a single acceleration module configured to accelerate a plurality of eBeams B having different energy levels in a variable manner according to conditions.

The X-ray guide unit 20 may convert at least one of the first eBeam B1 and the second eBeam B2 accelerated by the eBeam acceleration unit 10 into the X-rays X and guide the X-rays to the object O. In the present embodiment, the first eBeam B1 is converted into the X-rays X. The X-ray guide unit 20 may include a first conversion unit 21 to convert the first eBeam B1 into the X-rays X, and a first collimator unit 22 to guide the X-rays X to the object O.

The first conversion unit 21 may include a tungsten (W) target made of W having long life characteristics. The first conversion unit 21 including the W target may be in a plate form and be arranged to face the first acceleration unit 11 of the eBeam acceleration unit 10. The first collimator unit 22 may control a direction of the X-rays X converted and emitted by the first conversion unit 21 and guide the X-rays X to the object O.

The first collimator unit 22 may include a first slit 23 to guide the X-rays X by allowing the X-rays X to pass through. Since the first slit 23 is disposed between the first conversion unit 21 and the object O facing each other, the X-rays X passed through the first slit 23 is guided to the object O.

The neutron guide unit 20 may convert the second eBeam B2 between the first eBeam B1 and the second eBeam B2 accelerated by the eBeam acceleration unit 10, into the neutrons N and guide the neutrons N to the object O. Although the present embodiment is described in such a manner that the X-ray guide unit 20 converts the first eBeam B1 into the X-rays X and the neutron guide unit 20 converts the second eBeam B2 into the neutrons N, this is only by way of example. That is, for example, the first eBeam B1 may be converted into the neutrons N whereas the second eBeam B2 is converted into the X-rays X.

In the same manner as the X-ray guide unit 20, the neutron guide unit 30 may include a second conversion unit 31 and a second collimator unit 32.

The second conversion unit 31 may convert the second eBeam B2 into the neutrons N. As the first conversion unit 21 does, the second conversion unit 31 may also include a W target made of W. However, the second conversion unit 31 may have a larger length than the first conversion unit 21 with respect to a direction in which the second eBeam B2 is converted into the neutrons N and advanced. That is, whereas the first conversion unit 21 is in the plate form, the second conversion unit 31 may be in a bar form. For reference, according to an increase in the length of the second conversion unit 31, a neutron production rate may be increased.

When the second eBeam B2 thus enters the second conversion unit 31, gamma rays of high energy may be firstly emitted. The gamma rays may emit the neutrons N, secondly, through a photo neutron ($\gamma$, n) reaction. Here, when a beam current of the second eBeam B2 is about 1 mA ($6.26 \times 10^{15}$ electrons/sec), the neutron production rate by the second conversion unit 31 including the W target as the second eBeam B2 having the energy level of about 15 MeV may be about $5 \times 10^{12}$ neutrons/sec.

In the present embodiment, the second conversion unit 31 is described as a single module configured to detect presence of nuclear materials C from the object O. However, the second conversion unit 31 may include a plurality of modules to detect not only presence of the nuclear materials C3 but also an arrangement state of the nuclear materials C3 in the object O.

In the same manner as the first collimator unit 22, the second collimator unit 32 may include a second slit 33 to guide the neutrons N to the object O. In the same manner as the first slit 23, the second slit 33 may be disposed between the second conversion unit 31 and the object O facing each other.

The X-ray guide unit 20 and the neutron guide unit 30 may be disposed between the eBeam acceleration unit 10 and the object O and arranged parallel with each other to face the eBeam acceleration unit 10.

The detection unit 40 may detect the X-rays X and the neutrons N passed through the object O. For this purpose, the detection unit 40 may include a first detection unit 41 and a second detection unit 42 for detecting the X-rays X and the neutrons N, respectively, and may detect the X-rays X and the neutrons N.

A method of inspecting the contents C of the object O by the above-configured security checking system 1 will be described with reference to FIG. 1.

As shown in FIG. 1 the first eBeam B1 and the second eBeam B2 are accelerated by the first acceleration unit 11 and the second acceleration unit 12 of the eBeam acceleration unit 10. The accelerated first eBeam B1 and second eBeam B2 may enter the first conversion unit 21 and the second conversion unit 31 of the X-ray guide unit 20 and the neutron guide unit 30. Therefore, the first eBeam B1 and the second eBeam B2 may be converted to the X-rays X and the neutrons N, respectively, and be guided to the object O through the first collimator unit 22 and the second collimator unit 32.

The X-rays X and the neutrons N passed through the object O may be detected by the first detection unit 41 and the second detection unit 42 of the detection unit 40. Therefore, at least one of the metallic materials C1 and the organic materials C2 may be detected by the X-rays X passed through the object O, and the nuclear materials C3 may also be detected.

Figure 2:
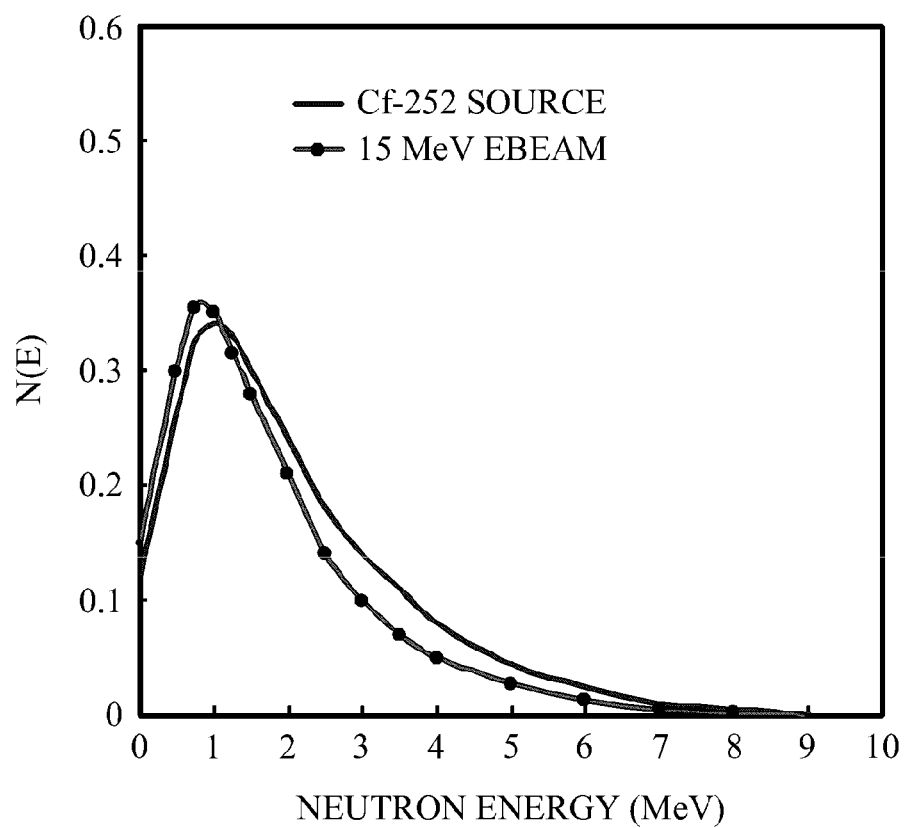
FIG. 2 is a graph comparing an energy spectrum generated using a Cf-252 isotope conventionally used as a neutron source and an energy spectrum generated using an electron beam (eBeam) having an energy level of about 15 MeV.

FIG. 2 shows a graph comparing an energy generated using a Cf-252 isotope conventionally used as a neutron source with an energy spectrum generated using the second eBeam B2 having an energy level of about 15 MeV. As shown in FIG. 2, the neutron spectrum generated from the second eBeam B2 of about 15 MeV is similar to the spectrum generated from the Cf-252 isotope. Accordingly, when the neutrons N are generated using the eBeam B generated from the eBeam acceleration unit 10, the inspection efficiency with respect to nuclear materials may be expected to be similar to the inspection efficiency of the conventional Cf-252 isotope. For reference, an average energy level of the neutrons N generated using the eBeam B is about 2 MeV.

Figure 3:
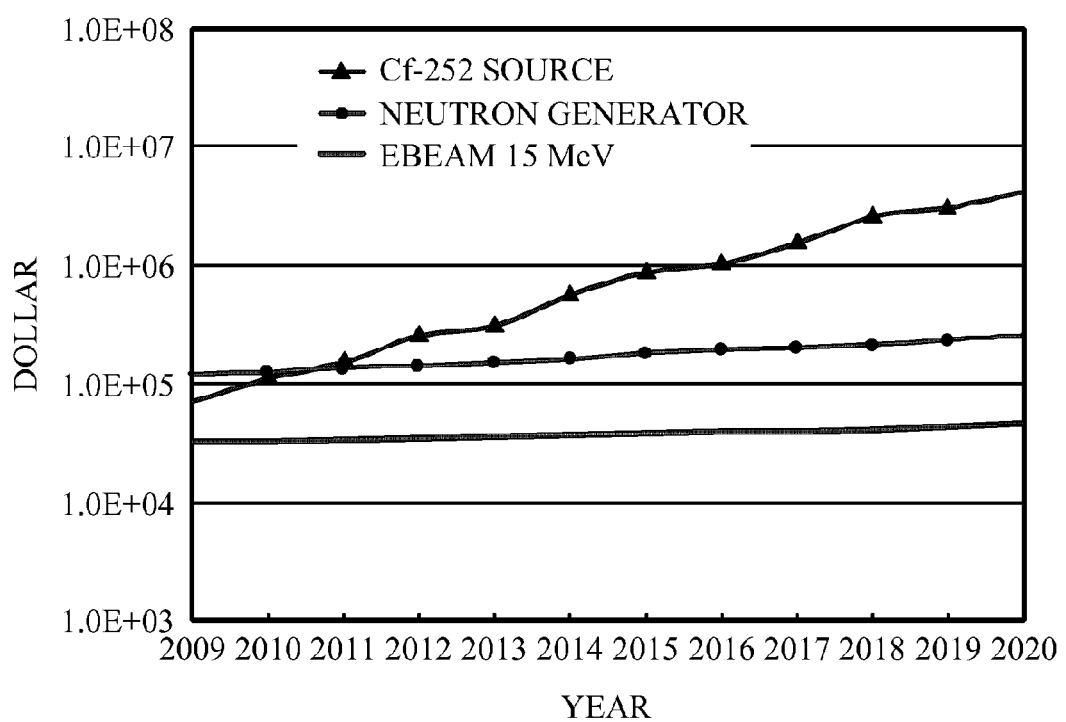
FIG. 3 is a graph comparing economical efficiencies among a Cf-252 isotope, a conventional neutron generator, and a security checking system that uses a neutron generated using an eBeam according to an embodiment of the present invention.

FIG. 3 shows a graph comparing economical efficiencies among the Cf-252 isotope, a conventional neutron generator, and the eBeam B that may be used for inspection of the contents C of the object O. The graph of FIG. 3 analyzes by comparing lifetime cumulative costs under the condition that the neutron production rate is maintained to $1.0 \times 10^8$ n/sec. In case of the Cf-252 isotope, the half-life is about 2.8 years and periodical recharging of a new source is necessary. Therefore, the cost continuously increases. In case of the conventional neutron generator, an initial purchase cost is relatively high and continuous gas recharge is required. That is, the neutron generator may be uneconomical in view of the cost. However, the neutrons N generated using the eBeam B according to an embodiment may be used for a relatively long time at a relatively low cost.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A security checking system comprising:
    an electron beam (eBeam) acceleration unit to accelerate an eBeam having at least one energy level;
    an X-ray guide unit to convert the eBeam accelerated by the eBeam acceleration unit into X-rays and guide the X-rays to an object including a cargo;
    a neutron guide unit to convert the eBeam accelerated by the eBeam acceleration unit into neutrons and guide the neutrons to the object; and
    a detection unit to detect the X-rays and the neutrons passed through the object,
    wherein the X-ray guide unit comprises at least one first conversion unit to convert the eBeam into the X-rays and at least one first collimator unit to guide the X-rays to the object,
    the neutron guide unit comprises at least one second conversion unit to convert the eBeam into the neutrons and at least one second collimator unit to guide the neutrons to the object, and
    a length of the second conversion unit is larger than a length of the first conversion unit with respect to a direction in which the eBeam is converted to the neutrons and advanced.

2. The security checking system of claim 1, wherein the X-ray guide unit and the neutron guide unit are arranged parallel with each other to face the eBeam acceleration unit.

3. The security checking system of claim 1, wherein the eBeam acceleration unit comprises:
    a first acceleration unit to accelerate a first eBeam having at least one energy level toward the X-ray guide unit; and
    a second acceleration unit to accelerate a second eBeam having at least one energy level which is different from the energy level of the first eBeam toward the neutron guide unit.

4. The security check system of claim 1, wherein the first conversion unit and the second conversion unit comprises a tungsten (W) target.

5. The security check system of claim 1, wherein the detection unit comprises a first detection unit to detect the X-rays and a second detection unit to detect the neutrons.

6. A security check system comprising:
    an electron beam (eBeam) acceleration unit to accelerate an eBeam having at least one energy level;
    a guide unit to convert the eBeam accelerated by the eBeam acceleration unit into X-rays and neutrons and guide the X-rays and the neutrons to an object including a cargo wherein the guide unit comprises an X-ray guide unit to guide the X-rays and a neutron guide unit to guide the neutrons and the X-ray guide unit and the neutron guide unit are arranged parallel with each other to face the eBeam acceleration unit; and
    a detection unit to detect the cargo and nuclear materials included in the object, by detecting the X-rays and the neutrons passed through the object wherein the detection unit comprises a first detection unit to detect the X-rays and a second detection unit to detect the neutrons, and
    wherein the X-ray guide unit comprises at least one first conversion unit to convert the eBeam into the X-rays and at least one first collimator unit to guide the X-rays to the object,
    the neutron guide unit comprises at least one second conversion unit to convert the eBeam into the neutrons and at least one second collimator unit to guide the neutrons to the object, and
    a length of the second conversion unit is larger than a length of the first conversion unit with resect to a direction in which the eBeam is converted to t e neutrons and advanced.

7. The security check system of claim 6, wherein the eBeam acceleration unit comprises a plurality of acceleration units to accelerate at least one eBeams having different energy levels.

* * * * *